United States Patent
Pearce

(10) Patent No.: US 8,590,967 B1
(45) Date of Patent: Nov. 26, 2013

(54) CHILD CAR SAFETY SEAT

(76) Inventor: Ray R Pearce, Lead, SD (US)

(*) Notice: Subject to any disclaimer, the term of this patent is extended or adjusted under 35 U.S.C. 154(b) by 0 days.

(21) Appl. No.: 13/527,812

(22) Filed: Jun. 20, 2012

(51) Int. Cl.
*A47D 1/10* (2006.01)

(52) U.S. Cl.
USPC .................................................. 297/256.15

(58) Field of Classification Search
USPC ............ 297/256.16, 216.11, 250.1, 467, 488, 297/487, 256.15
See application file for complete search history.

(56) References Cited

U.S. PATENT DOCUMENTS

| | | | | |
|---|---|---|---|---|
| 3,762,768 A | * | 10/1973 | Hyde et al. | 297/253 |
| 4,376,551 A | * | 3/1983 | Cone | 297/256.13 |
| 4,729,600 A | * | 3/1988 | Single et al. | 297/256.13 |
| 4,754,999 A | * | 7/1988 | Kain | 297/256.14 |
| 4,986,600 A | * | 1/1991 | Leblanc et al. | 297/238 |
| 5,427,432 A | * | 6/1995 | Meeker et al. | 297/256.15 |
| 5,690,382 A | * | 11/1997 | Cone | 297/256.15 |
| 5,957,531 A | | 9/1999 | Kane et al. | |
| 6,000,753 A | * | 12/1999 | Cone, II | 297/256.16 |
| 6,237,999 B1 | | 5/2001 | Hobson | |
| 7,163,265 B2 | | 1/2007 | Adachi | |
| 7,261,381 B2 | * | 8/2007 | Tsai | 297/488 |
| 7,270,373 B2 | | 9/2007 | Sakumoto | |
| 8,007,043 B1 | | 8/2011 | Vuong | |
| 2003/0062746 A1 | | 4/2003 | Takizawa | |
| 2011/0133532 A1 | | 6/2011 | Zhao | |

* cited by examiner

*Primary Examiner* — Milton Nelson, Jr.
(74) *Attorney, Agent, or Firm* — Lynn E. Barber

(57) ABSTRACT

An improved child car safety seat is provided having a restraining system consisting of two chest restraining straps and one lower restraining strap, which are independently adjustable. The two chest restraining straps preferably comprise an adjustable crisscross harness system in which the chest restraining straps are crossed in front of the child. The child car safety seat also has an adjustable restraining safety bar.

14 Claims, 10 Drawing Sheets

CHILD CAR SAFETY SEAT

BACKGROUND OF THE INVENTION

1. Field of the Invention

This invention relates generally to child car safety seats, and in particular relates to a child car safety seat having a crisscross restraining harness and moveable safety bar.

2. Description of the Related Art

Many different types of child car seats are known in the art for seating a child in a car and designed to keep the child safe, particularly in the case of an accident. Typically such car seats include a back, a seat, means to hold the child in the car seat such as shoulder or chest restraining straps, and means to attach the car seat to the car such as by providing a means for the child car seat to be held with a vehicle seat belt. Often the means of holding the child in the car seat are complicated and difficult to adjust or fasten. In addition, prior child safety seats typically either do not restrain the child well or are very complicated and difficult to use.

Prior car seats' restraining straps usually use clips at the front to hold the two shoulder/chest straps together. These clips, typically made of plastic that can be subject to material breakdown as a result of age and over-exposure to heat and sun, can become brittle and break. The clips can also give way in an accident, and/or older children can undo the clip so that the child is no longer secured behind the clipped shoulder straps. The child is thus not held securely in the case of a sudden movement change of the vehicle, such as a swerve or sudden stop. In addition, the child can climb out of the car seat if the shoulder straps are not held together.

Most prior car seats have no secondary restraining mechanism that can function to hold a child in the seat if the shoulder straps become unclipped or are otherwise not functioning or fastened properly. For that minority of car seats that also have a bar across the front of the child, these bars are generally permanent, making it difficult to remove the child or position the child in the seat.

To adjust the shoulder strap lengths of prior car seats for different children or for when a child grows, the car seat must be removed from the car so that the adult can reach into the back of the seat back, where the seat belts come through the seat back, and can move the seat belt to a different position. This difficulty of adjustment can lead to adults not adjusting the shoulder strap length as often as is needed, with the possible result that the child is either not held sufficiently tightly within the car seat, or is held uncomfortably too tightly therein.

While U.S. Pat. No. 4,376,551 of Cone has a restraining apparatus that includes shoulder straps, a padded shield and an adjustable lower strap, the shield is not adjustable to fit the size of the child and straps are not independently adjustable.

It is therefore an object of the invention to provide a child car safety seat that has a restraining system consisting of two chest restraining straps and one lower restraining strap, which are independently adjustable.

It is a further object of the invention to provide a child car safety seat in which the two chest restraining straps comprise an adjustable crisscross harness system in which the chest restraining straps are crossed in front of the child.

It is a further object of the invention to provide a child car safety seat that has an adjustable restraining safety bar.

It is a further object of the invention to provide a child car safety seat having shoulder straps that may be adjusted without removing the child car safety seat completely from the vehicle seat.

It is a further object of the invention to provide a child car safety seat having a shoulder strap design that securely prevents the child from exiting the seat.

Other objects and advantages will be more fully apparent from the following disclosure and appended claims.

SUMMARY OF THE INVENTION

The invention herein is an improved child car safety seat having a restraining system consisting of two chest restraining straps and one lower restraining strap, which are independently adjustable. The two chest restraining straps preferably comprise an adjustable crisscross harness system in which the chest restraining straps are crossed in front of the child. The child car safety seat also has an adjustable restraining safety bar.

Other objects and features of the inventions will be more fully apparent from the following disclosure and appended claims.

DETAILED DESCRIPTION OF THE INVENTION AND PREFERRED EMBODIMENTS THEREOF

The present invention provides a child car safety seat designed for attachment to an automobile seat. The seat surface and back of the child car safety seat of the invention may be made in any manner and size as are known in the art for seating a child in a car seat, for example a formed plastic surface upon which are fastened cushions of plastic or fabric, or other means as known or desired for the comfort and safety of the child and for maintenance and cleaning of the car seat as known.

In summary, the main improvements found in the present invention and discussed in more detail below include:

a) a restraining system consisting of two chest restraining straps and one lower restraining strap having a belt length adjuster, in which the two chest restraining straps preferably comprise an adjustable crisscross harness system in which the chest restraining straps are crossed in front of the child; and b) an adjustable restraining safety bar.

Figure 1:
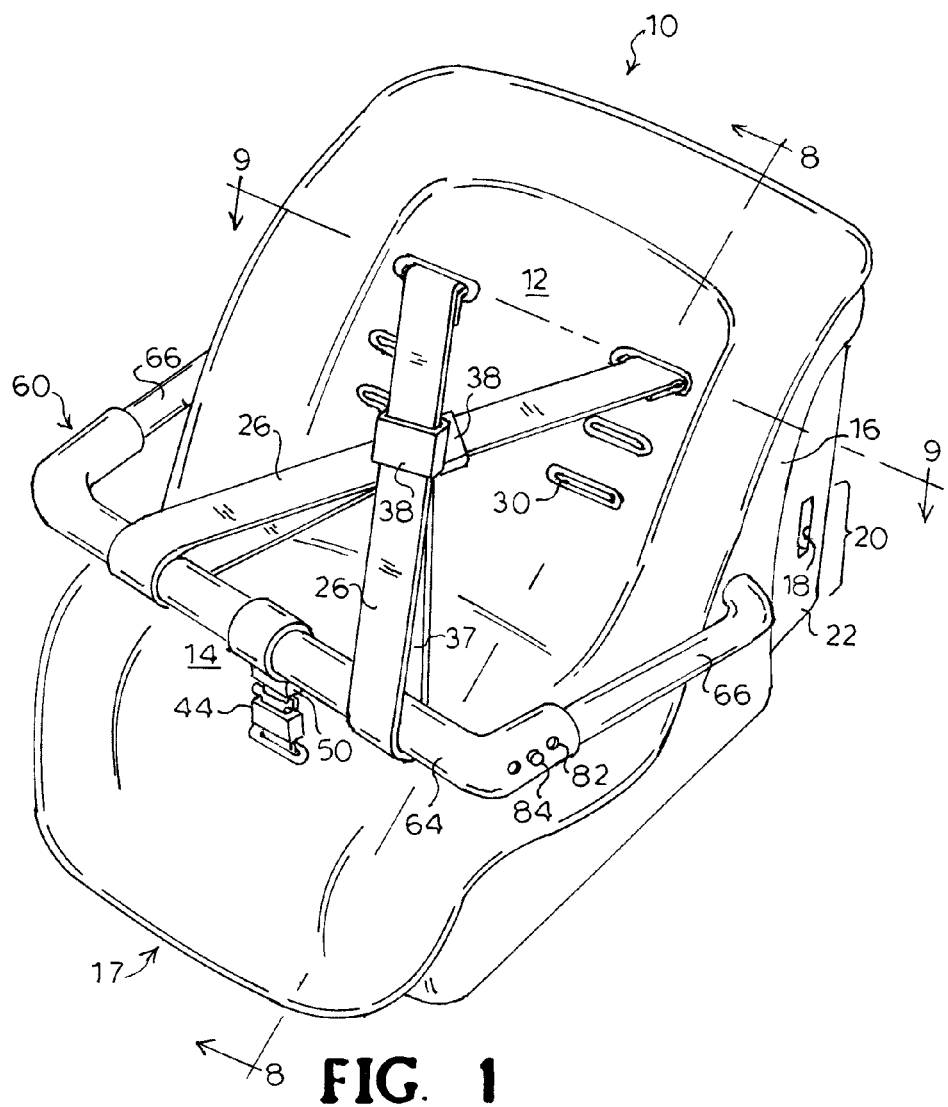
FIG. 1 is a side front perspective view of the child car safety seat of the invention.

Referring now to the figures, the child car safety seat 10 of the invention has a preferably padded back 12 attached to a preferably padded seat 14, typically both preferably positioned on a frame or other holding support 16 as known in the art (FIG. 1). The rear 13 of the child car safety seat abuts a vehicle seat (not shown) as known in the art when the child car safety seat 10 is placed in a vehicle with the child facing forward, and the front 17 of the child car safety seat faces forward. The sides 15 of the child car safety seat 10 are behind and on opposite sides of a child sitting in the child car safety seat as in prior child car seats. While in the figures herein, particular curvatures, shapes, and thicknesses of the padded back 12, padded seat 14 and frame/support 16 are shown, these may be designed in any manner or shape to comfortably and safely hold a child as known in the art without departing from the invention herein.

In the invention herein, seat belt fastening means, such as at least one access hole 18, and preferably at least two access holes 18 (FIGS. 1, 2A and 2B), are provided on the lower portion 20 of the child car safety seat 10, such as the frame below the padded back 12. As with most child car seats known in the art, the child car safety seat 10 of the invention may be made to have lower "wings" 22, and in this case there may be access holes 18 in each wing 22. Depending on the structure of the underlying seat and back of the child car safety seat 10, the number and position of the access holes 18 may be adjusted as known in the art, so long as the width of the access hole(s) 18 is sufficient to allow insertion of a vehicle seat belt 24 and so long as the child car safety seat 10 can be securely and safely held in the vehicle. To install the child car safety seat 10 in the automobile seat in a forward-facing orientation, the appropriate car seat belt 24 is threaded through the access holes 18 (FIGS. 3A and 3B).

The two independent chest restraining straps 26 of the invention together form a crisscross harness system on the child car safety seat 10 that does not require threading a child's limbs through harness loops (FIG. 1). It is important in the invention herein that the chest restraining straps 26 are crossed over each other in front of a child placed in the child car safety seat 10, rather than simply extending downward in a parallel or close to to parallel position. In the crisscross harness system of the invention, the pair of chest restraining straps 26 consists of two independent chest restraining straps, each of which has a first end 27 and a second end 29. The first end 27 of each chest restraining strap 26 has a loop 28, as can be formed, for example, by stitching a loop at the end of the chest restraining strap 26 as is known in the art (FIGS. 4-5).

Figure 3A:
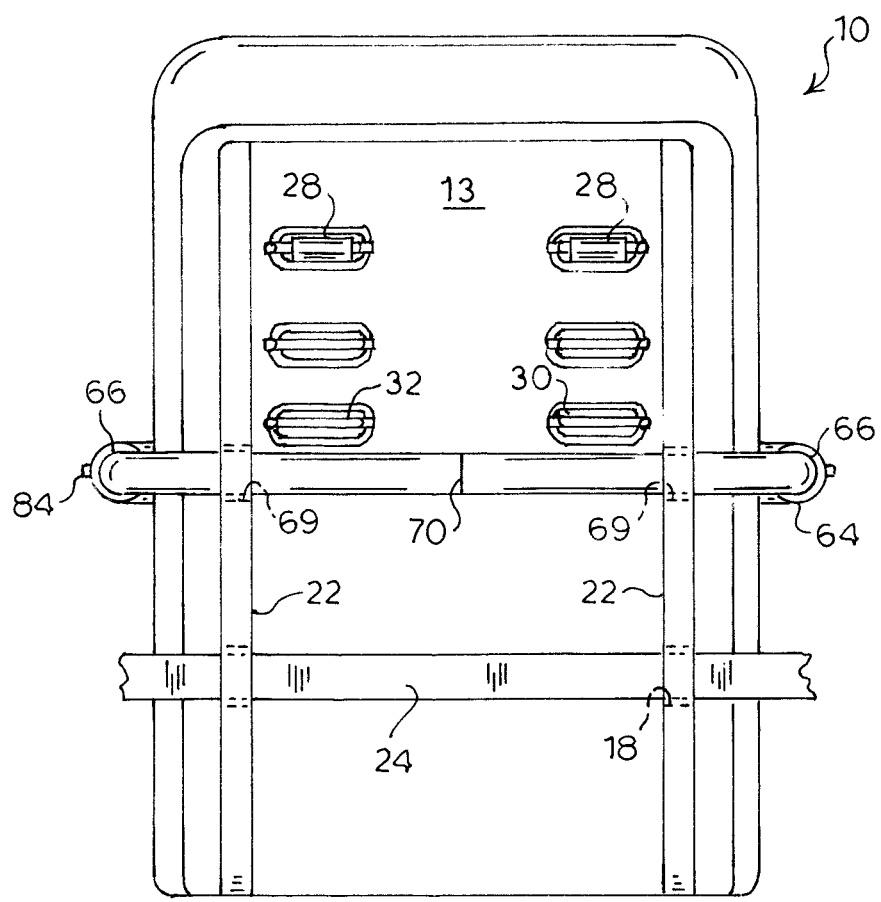
FIG. 3A is a back elevational view of the safety seat of FIG. 2A.
Figure 3B:
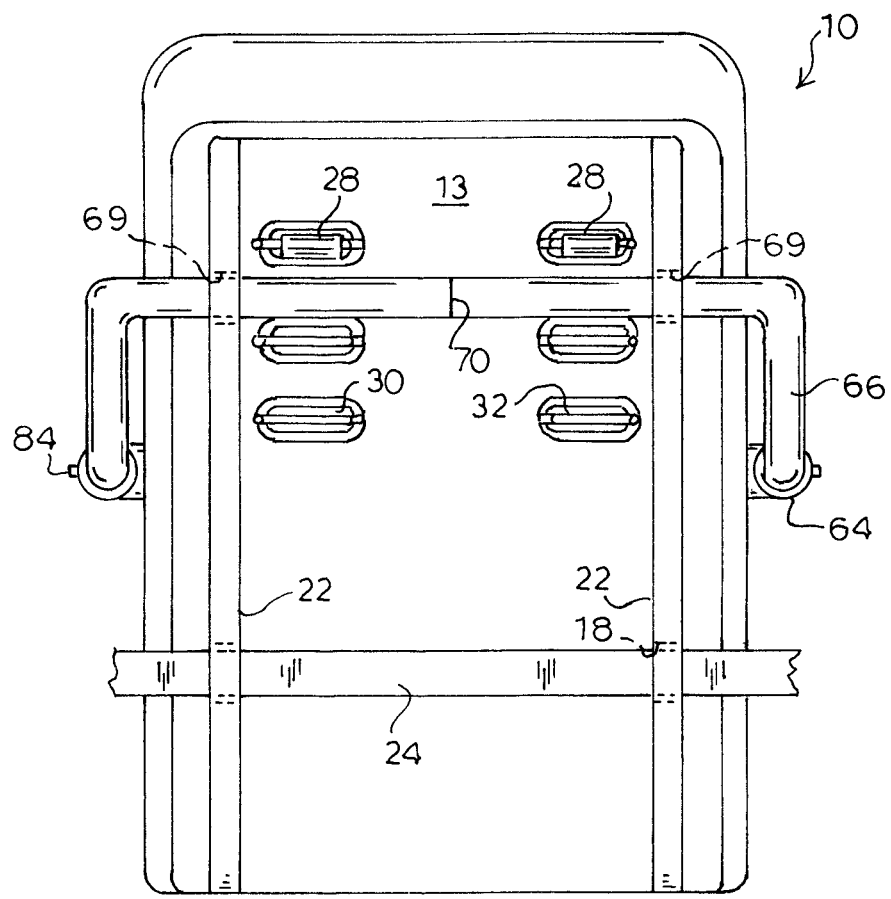
FIG. 3B is a back elevational view of the safety seat of FIG. 2B.

Strap holes 30 are provided in the back of the child car safety seat 10, each of which strap holes 30 extends through any support/frame 16 and the padded back 12 as is known in the art for child car seats (FIGS. 3A and 3B). Strap holes 30 should be wide enough to accommodate the width of the chest restraining straps 26. Preferably there are three pairs of strap holes 30 with each pair of strap holes comprising a strap hole for each of the straps, the strap holes 30 of each pair being aligned at the same height on the back of the child car safety seat 10. The height on the back of the child car safety seat 10 where the chest restraining straps go through the back is adjusted by removing the chest restraining straps 26 from one pair of strap holes 30 and repositioning them in another pair of strap holes 30.

Figure 8:
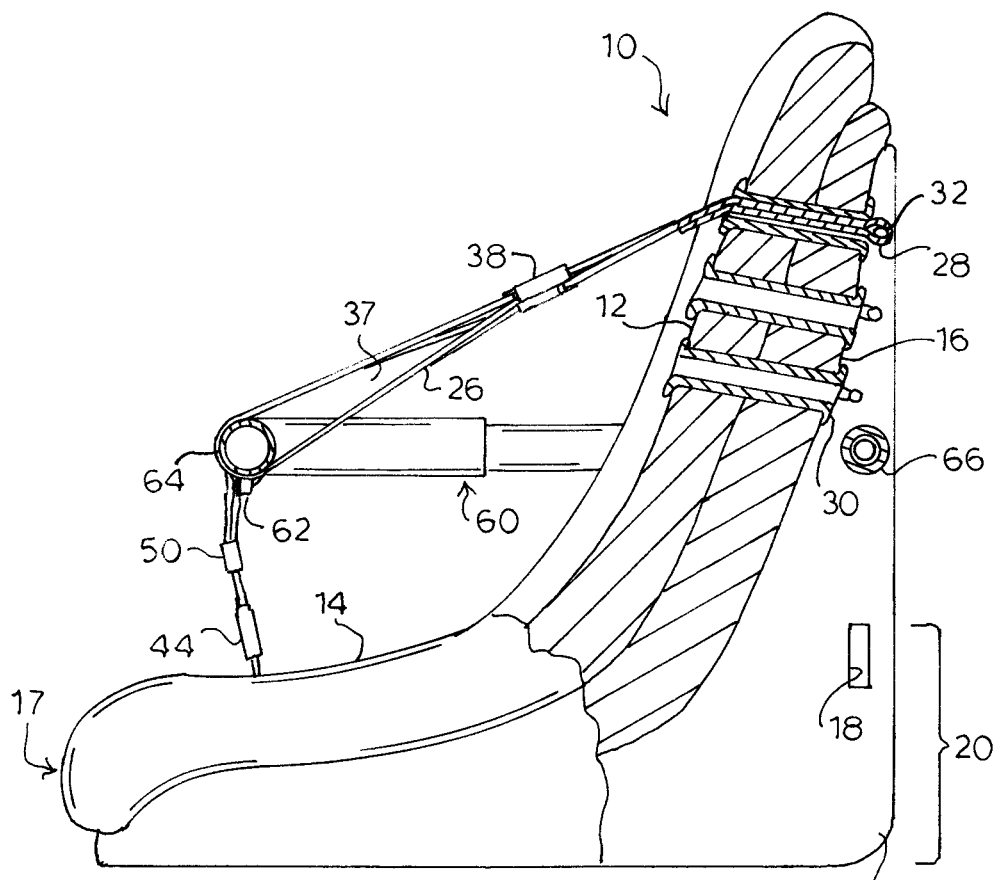
FIG. 8 is a cross-sectional view, taken along line 8-8 of FIG. 1, of a chest restraining strap extending from the safety bar, through the seat back and looped around the strap retainer.
Figure 9:
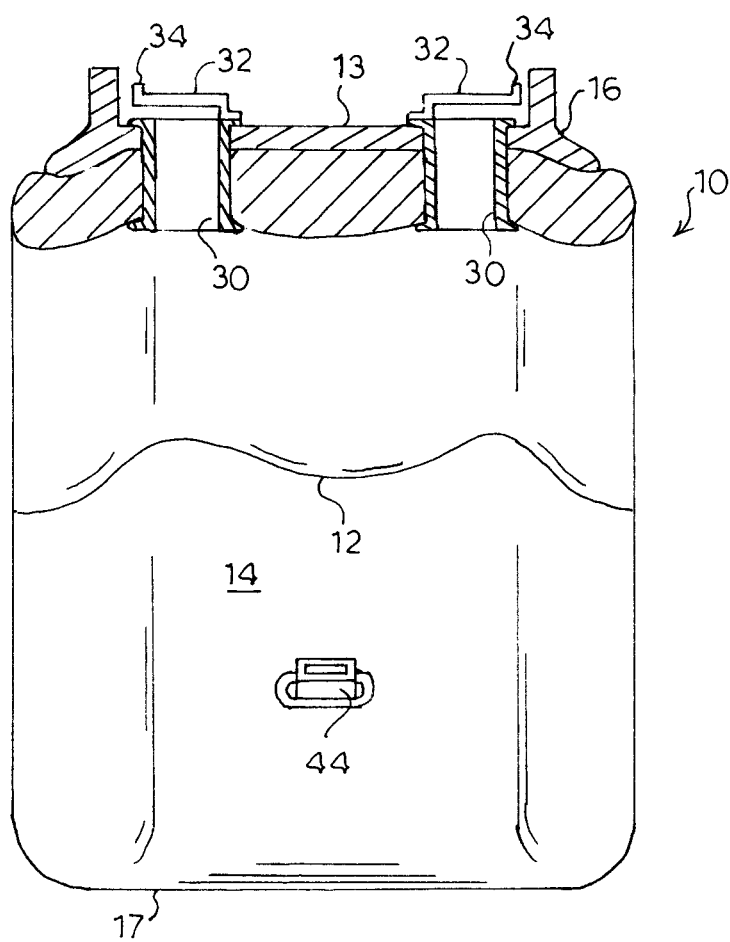
FIG. 9 is a cross-sectional view of the child car safety seat of the invention showing the strap retainers and strap holes, taken along line 9-9 of FIG. 1.

Adjacent to and centered with respect to each strap hole 30 is a strap retainer 32 having a bent end 34 as shown (FIG. 9), and extending laterally across the rear side 13 of the child car safety seat 10 parallel to and behind each strap hole 30 (FIGS. 3A and 3B). Each strap retainer 32 is preferably molded on the rear side 13 of the child car safety seat 10, or may be pop riveted to the rear as known in the art. The strap retainer 32 preferably is sufficiently distant from the strap hole 30 so that the strap loop 28 may be easily grasped and slid over the bent end 34 and held in place by the bent end 34, but is sufficiently close to the rear side 13 of the child car safety seat 10 so that it does not protrude or catch on things. To fasten each strap 26 at the chosen height on the rear side 13 of the child car safety seat 10, the loop 28 at the end of the strap 26 is inserted through one of three (or more if so constructed by the manufacturer) strap holes 30 at the appropriate side of the rear side 13 of the child car safety seat 10. The loop 28 is then placed over the adjacent strap retainer as shown (FIG. 8). If the chest restraining straps 26 are too long for a particular child they may be effectively shortened by shortening the strap length with an adjustable locking slide mechanism 38 as known in the art (see below) or by placing each chest restraining strap 26 through a strap hole 30 and then pulling it sufficiently through that strap hole 30 so that the loop 28 can be placed around a strap retainer 32 that is adjacent another strap hole 30 (not shown).

Figure 4:
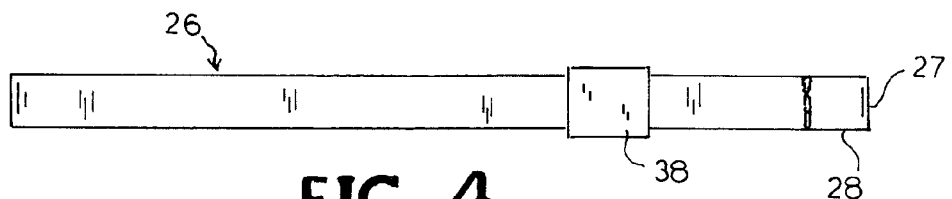
FIG. 4 is a plan view of one of the chest restraining straps of the invention.
Figure 5:
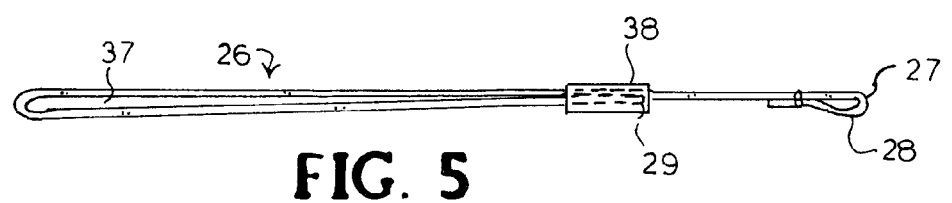
FIG. 5 is a side elevational view of the chest restraining strap of FIG. 4.

As shown in FIG. 8, in the child car safety seat 10 of the invention, the opposite (second) end 29 of each chest restraining strap 26 from the loop 28 extends from the rear side 13 of the child car safety seat 10 around an adjustable, moveable safety bar 60 at the front of the child car safety seat 10 in a continuous large loop 37 and is adjustably attached to that chest restraining strap 26 between the first and second ends by an adjustable locking slide mechanism 38 as known in the art, for example, with a webbing strap adjuster as known in the art (FIGS. 4-5 and 8). The straps can be removed by threading first end 27 of the chest restraining straps 26 through locking slide mechanism 38.

Figure 6:
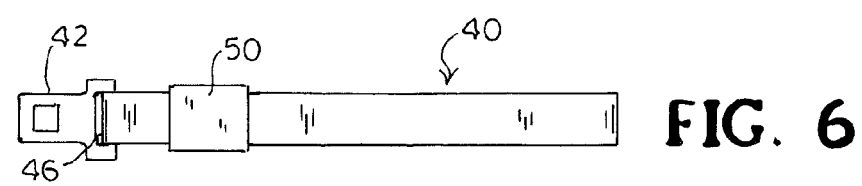
FIG. 6 is a plan view of the lower restraining strap of the invention.
Figure 7:
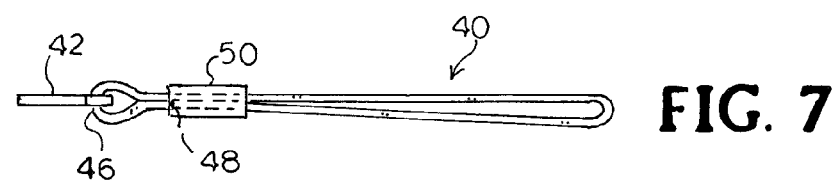
FIG. 7 is a side elevational view of the lower restraining strap of FIG. 6.

As shown in FIG. 1, the child car safety seat 10 of the invention has an independent lower restraining strap 40, which is looped around the moveable safety bar 60 and is attached to the bottom front part of the child car safety seat 10. The means of attachment is preferably via snap-in locking tongue 42 and receiver 44, similar to those found on vehicle seat belts (FIGS. 1 and 6-7). Preferably, therefore, there is a female seat belt receiver 44 on the bottom front of the child car safety seat 10 of the invention as shown, for example, in FIG. 8, protruding through the bottom of the child car safety seat 10 approximately one-third of the distance from the front of the child car safety seat 10 from its front and secured thereto by means known in the art, and a male tongue 42 on a first end 46 of the lower restraining strap 40. Other releasable attachment means as known in the art may be used to attach the lower restraining strap 40 to the bottom of the child car safety seat 10. The second end 48, of the lower restraining strap 40 is attached to an area of the lower restraining strap 40 between the first and second end by an adjustable locking slide mechanism 50, for example, a webbing strap adjuster as known in the art (FIGS. 1 and 6-7).

Because each chest restraining strap 26 crosses from one shoulder side of the child across the child's chest toward the child's lap, the location at which each of the chest restraining straps 26 loops around the safety bar 60 is on the opposite side of the safety bar from the side of the back of the child car safety seat 10 from where that chest restraining strap 26 is inserted through a strap hole 30. Thus, the chest restraining strap 26 that extends diagonally downward from over the child's right shoulder extends around the safety bar at the left side of the child. The location where the lower restraining strap 40 is looped around the safety bar 60 is midway between the locations where the chest restraining straps 26 loop around the safety bar 60 as shown in FIG. 1.

Figure 10:
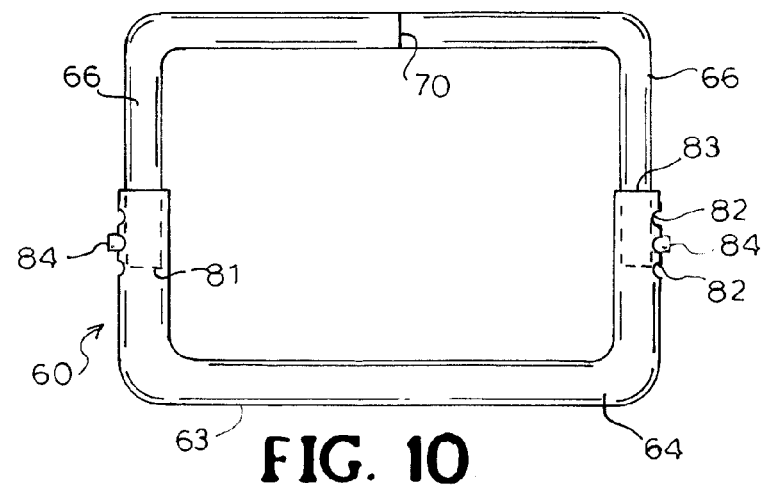
FIG. 10 is a top plan view of the assembled safety bar of the invention.

The safety bar 60 of the invention is preferably a three-part tubing construction with the padded front portion 63 of the safety bar 60 comprising a larger outer bar tubing 64 fitting over one end 74 of a smaller rear inner bar tubing 66 at each end of the outer bar tubing (FIGS. 1, 2A, 2B, 10 and 11). The outer bar tubing 64 is preferably of a shape to extend around the front of a child, for example, a U-shape, three-sides of rectangular shape (as shown) or a semicircular shape. The rear inner bar tubing 66 extends from being inserted into the large outer bar tubing 64 to around the back of the child car safety seat 10 to meet the other rear inner bar tubing as shown in FIG. 10.

Figure 11:
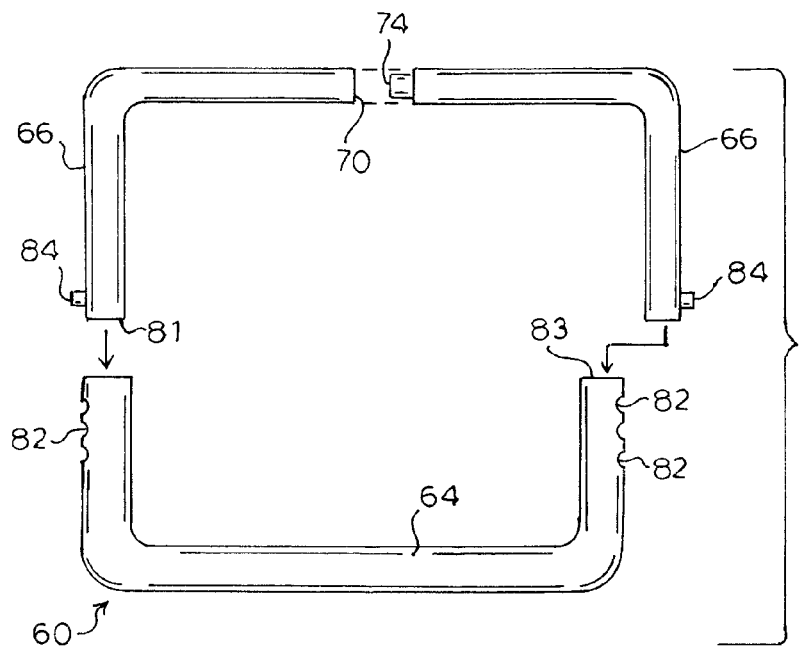
FIG. 11 is a top plan view of the safety bar of the invention showing the rear inner bar tubing pulled out of the outer bar tubing.
Figure 12:
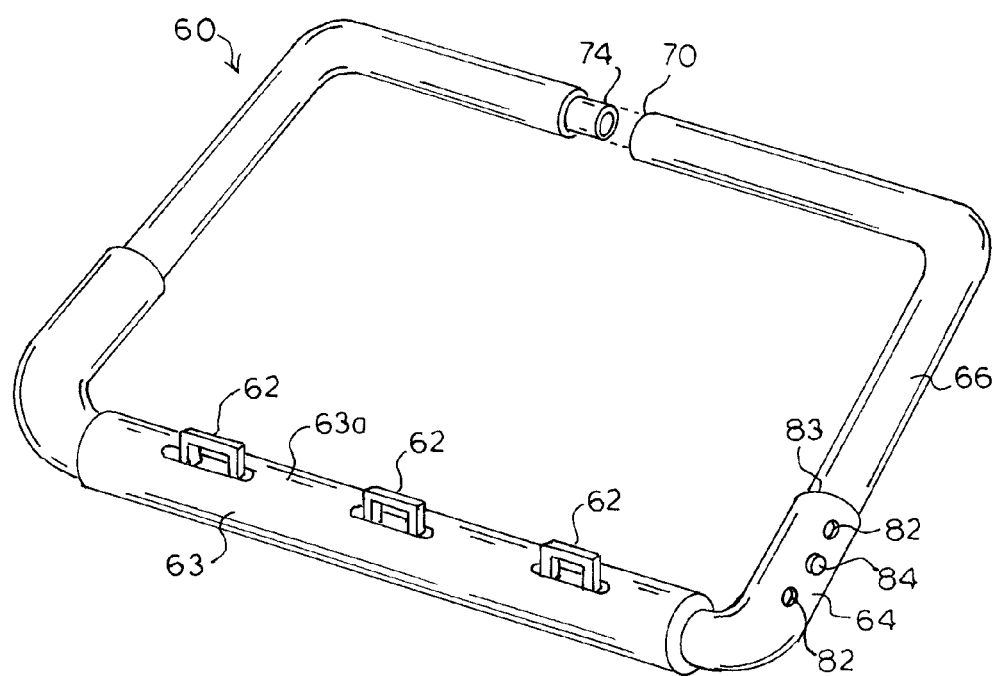
FIG. 12 is a perspective partial view of the safety bar of the invention.

The rear inner bar tubing 66 at each end of the safety bar 60 is inserted through mounting holes 69 as shown in FIGS. 3A and 3B at the rear and side of the child car safety seat of the invention. The ends of the inner bar tubing 66 are joined together at the rear and secured to each other via soldering, brazing or some other means known in the art, preferably with one smaller end 74 inserted in a larger end 70 (FIGS. 10-12). This provides a solid tubing at the rear of the child car safety seat and aids in the protection of the child in the event of an accident. The safety bar 60 is pivotably attached to the sides of the child car safety seat 10 so that the safety bar 60 can be pivoted about mounting holes 69 and moved vertically up and down, from a down position as appropriate for use of the child car safety seat 10 when a vehicle is moving (shown in solid lines in FIGS. 2A and 2B) to an up position (shown in dashed lines in FIGS. 2A and 2B) so that the child can be easily removed from the child car safety seat 10.

In a first embodiment (FIGS. 2A and 3A), the safety bar 60 extends from one side 15 of the child car safety seat 10 around the front of the child car safety seat 10 to the other side 15 so that the safety bar 60 is attached at the same level as is the front 63 of the safety bar 60 when it is in a down position (the entire inner bar tubing 66 is co-linear with u) the outer bar tubing 64), as when a child is safely positioned in the child car safety seat in a vehicle. In a second embodiment (FIGS. 2B and 3B), the safety bar 60 extends from one side 15 of the child car safety seat 10, but the inner bar tubing 66 bends at a 90-degree angle bend 76 to extend upward to a pivotable attachment site 72 above the bend 76 so that the two upper ends 80 of the safety bar 60 are attached above the level of the front 63 of the safety bar 60 when the safety bar 60 is a down position.

Figure 2A:
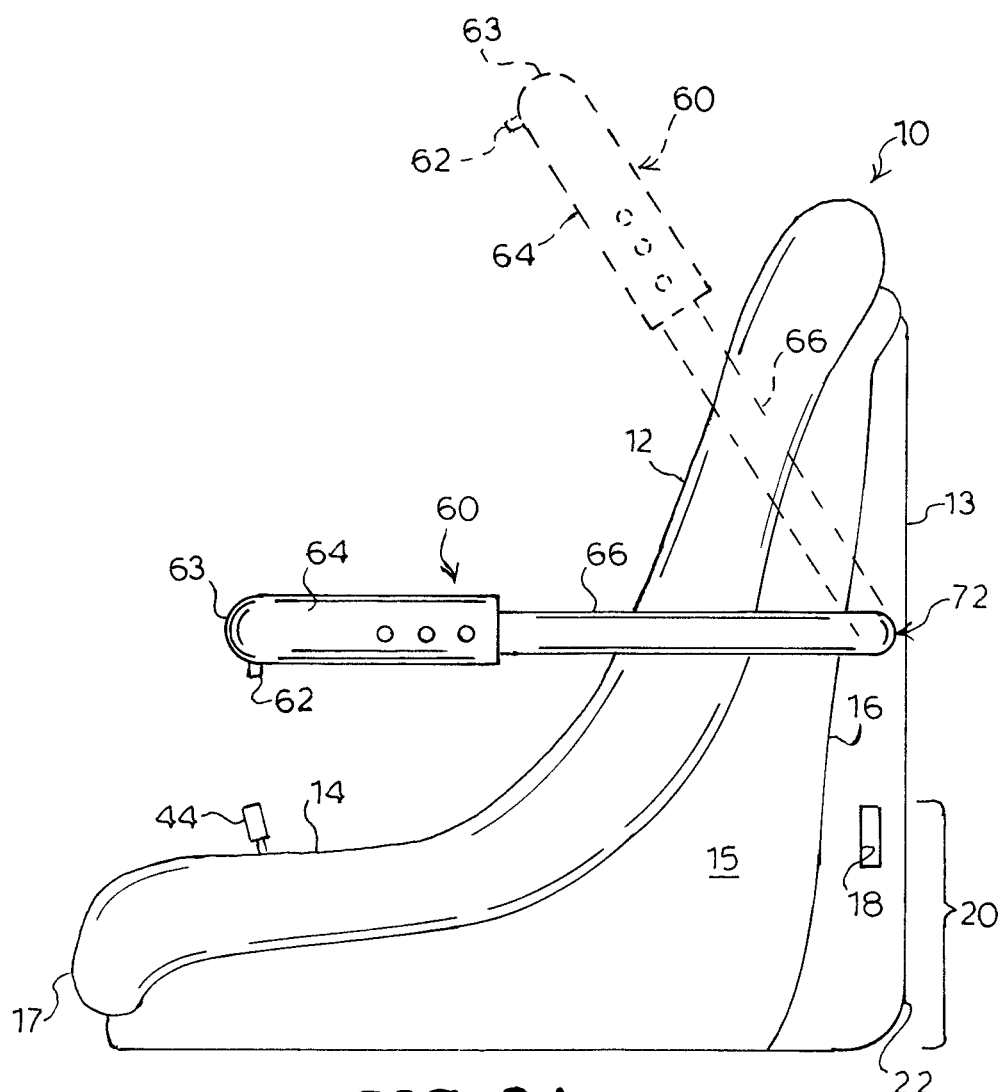
FIG. 2A is a side elevational view of a first embodiment of the safety seat of FIG. 1 with the straps removed.
Figure 2B:
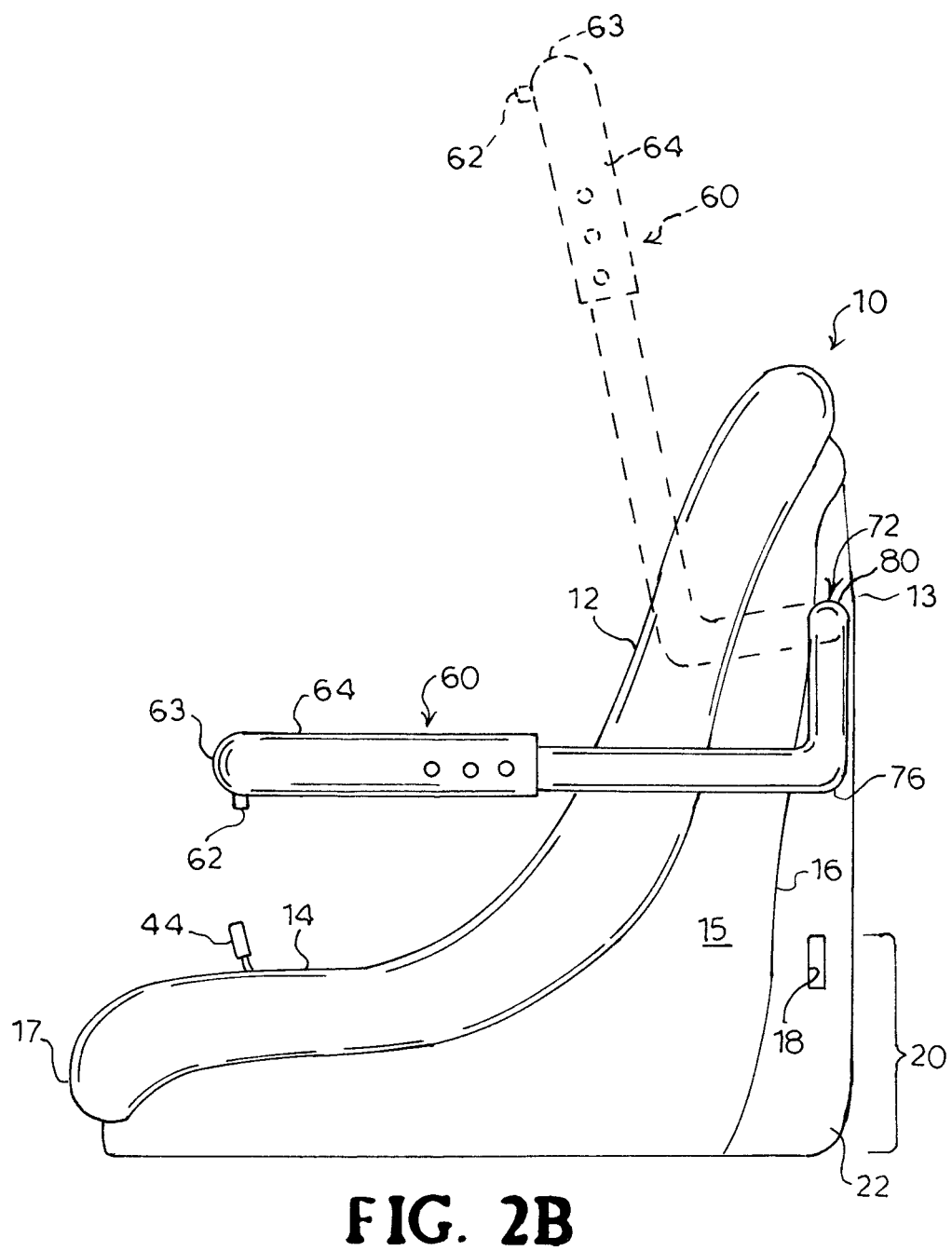
FIG. 2B is a side elevational view of a second embodiment of the safety seat of FIG. 1 with the straps removed.

The safety bar 60 is adjustable to provide a smaller or large enclosure for a child placed on the child car safety seat 10, for example, for a child of a different size or to make more room for the child. The outer bar tubing 64 of the safety bar 60 preferably contains a plurality of pre-drilled holes 82 on each end and can be extended in or out horizontally by depressing a spring loaded, spring loaded push release button (ball release mechanism) 84 located within the rear inner tubing section 66 as known in the art (FIGS. 2A, 2B).

Preferably at the locations where the chest restraining straps 26 and the lower restraining strap 40 are looped around the safety bar 60, there is a strap holding mechanism 62, which is preferably a D-shaped metal guide (FIG. 12). The D-shaped metal guides are preferably just large enough for the strap to fit through so that the particular strap that is inserted through the strap holding mechanism 62 can be inserted during manufacture and held securely without the strap shifting from side to side. These D-shaped metal guides are positioned laterally spaced apart from one another, preferably on the bottom of the safety bar 60 so that they are out of the way of the child's reach and any possibility of injury to the child is prevented (FIG. 1).

The safety bar 60 is preferably always padded, as known in the art, having a padded front portion 63, with access holes provide to allow the D-shaped metal guides or other strap holding mechanism 62 to protrude through the padding (FIG. 12). It is to be noted that for ease of showing the invention herein the padding is not shown in other figures.

Although the chest restraining straps 26 and the lower restraining strap 40 may be made of any safe, sturdy, wear-resistant material as known in the art, the preferred restraining straps are of webbing material as is known in the art and as typically used in child car seats, for example, being 2-2.5 inches in width. The length of the chest restraining straps 26 is sufficient to extend from any of the strap holes 30 on the back of the child car safety seat 10, around the safety bar 60 and back up at least about half way to the strap holes 30 to allow for length adjustment of the straps. The length of the lower restraining strap 40 is sufficient to extend from the receiver and around the safety bar 60 and back to the adjustable locking slide mechanism 50.

To place a child in the child car safety seat 10 of the invention herein, the loop 28 of each chest restraining strap 26 is placed through a strap hole 30 and the safety bar 60 is moved upward as shown in FIGS. 2A and 2B, which brings the attached chest restraining straps 26 upward as well. The lower restraining strap is unbuckled from the lower portion of the child car safety seat 10. Once the child is seated in the child car safety seat 10, the safety bar 60 is lowered and the lower restraining strap 40 is fastened. If appropriate, the loops 28 of the chest restraining straps 26 are placed in the appropriate strap hole 30 to form a crisscross. Chest restraining straps 26 can be shortened or lengthened using locking mechanism 38 as discussed above.

By adjusting the straps of the child car safety seat, or as desired by making the entire child car safety seat smaller or larger, occupants ranging from infants to toddlers may be accommodated therein.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A child car safety seat for placement on a vehicle seat for use by a child, the child car safety seat having a back, front, sides, a rear side, a seat and a frame, and further comprising:
 a) two chest restraining straps, each chest restraining strap having a first end having a loop and a second end and having a strap holding mechanism to adjustably hold the second end of the chest restraining strap to that chest restraining strap between the first end and the second end of that chest restraining strap;
 b) a lower restraining strap having a first end and a second end, an attachment means for attachment to the seat, and strap holding mechanism to adjustably hold the second end of the lower restraining strap to the lower restraining strap between the first end and the second end of the lower restraining strap;

c) a safety bar that is pivotably attached to the sides between a down position for use of the child car safety seat and an up position;
   wherein the back has a plurality of pairs of strap holes extending through the back and has a strap retainer adjacent each strap hole on the rear side;
   wherein to safely place a child in the child car safety seat, the loop at the first end of each of the two chest restraining straps is placed through a strap hole, the safety bar is placed around the front of the child; the chest restraining strap is crossed over the front of the child and around the safety bar, and the lower restraining strap is placed around the safety bar and is attached to the seat.

2. The child car safety seat of claim 1, further comprising at least one seat belt access hole on the back through which a vehicle seat belt may be inserted to attach the child car safety seat to a vehicle seat.

3. The child car safety seat of claim 1, wherein the safety bar is adjustable to provide a larger or smaller space for use when a child is positioned on the seat.

4. The child car safety seat of claim 3, wherein the safety bar comprises an outer bar tubing and two pieces of inner bar tubing, wherein the safety bar is assembled by releasably locking an end of each piece of inner bar tubing at any one of a plurality positions within an end of the outer bar tubing.

5. The child car safety seat of claim 4, wherein each piece of the inner bar tubing is pivotably attached to the side of the child car safety seat co-linearly with the outer bar tubing.

6. The child car safety seat of claim 4, wherein each piece of inner bar tubing has a right-angle bend and is pivotably attached to the side of the child car safety seat at a location that is above the outer bar tubing when the safety bar is in a down position.

7. The child car safety seat of claim 4, wherein the outer bar tubing has a plurality of holes at each of two ends and wherein each piece of inner bar tubing has a spring loaded push release button that is lockable in any of the holes when the inner bar tubing in placed within the outer bar tubing.

8. The child car safety seat of claim 1, wherein the safety bar further comprises three strap holding mechanisms for holding the chest restraining straps and the lower restraining strap in position on the safety bar.

9. The child car safety seat of claim 8, wherein each strap holding mechanism comprises a D-shaped guide.

10. The child car safety seat of claim 1, wherein the safety bar is attached to the child car safety seat through mounting holes.

11. The child car safety seat of claim 1, wherein the strap retainers are molded on the rear side parallel to the strap holes.

12. The child car safety seat of claim 1, wherein the strap retainers are riveted to the rear side.

13. The child car safety seat of claim 1, wherein the attachment means comprises a snap-in locking tongue and the child car safety seat further comprises a female seat belt receiver on the front of the seat.

14. The child car safety seat of claim 1, wherein the chest restraining straps and the lower restraining strap are of webbing material.

* * * * *